(12) United States Patent
Hayashizaka et al.

(10) Patent No.: US 11,629,270 B2
(45) Date of Patent: Apr. 18, 2023

(54) ELECTRICAL INSULATING RESIN COMPOSITION FOR PARTIAL-DISCHARGE RESISTANCE

(71) Applicants: Sumitomo Seika Chemicals Co., Ltd., Hyogo (JP); National Institute of Advanced Industrial Science and Technology, Tokyo (JP); Shizuoka institute of Science and Technology, Shizuoka (JP)

(72) Inventors: Noriyuki Hayashizaka, Hyogo (JP); Kazunori Kawasaki, Hyogo (JP); Masayuki Yamashita, Hyogo (JP); Takeo Ebina, Sendai (JP); Takahiro Ishida, Fukuroi (JP); Satomi Hattori, Fukuroi (JP)

(73) Assignees: Sumitomo Seika Chemicals Co., Ltd., Hyogo (JP); National Institute of Advanced Industrial Science and Technology, Tokyo (JP); Shizuoka Institute of Science and Technology, Shizuoka (JP)

( * ) Notice: Subject to any disclaimer, the term of this patent is extended or adjusted under 35 U.S.C. 154(b) by 0 days.

(21) Appl. No.: 15/742,853

(22) PCT Filed: Jul. 7, 2016

(86) PCT No.: PCT/JP2016/070161
§ 371 (c)(1),
(2) Date: Jan. 8, 2018

(87) PCT Pub. No.: WO2017/007000
PCT Pub. Date: Jan. 12, 2017

(65) Prior Publication Data
US 2018/0201804 A1   Jul. 19, 2018

(30) Foreign Application Priority Data

Jul. 9, 2015 (JP) .............................. JP2015-138128

(51) Int. Cl.
*C09D 177/10* (2006.01)
*H01B 7/02* (2006.01)
(Continued)

(52) U.S. Cl.
CPC .............. *C09D 177/10* (2013.01); *C08K 3/22* (2013.01); *C08L 101/00* (2013.01); *C09D 5/00* (2013.01);
(Continued)

(58) Field of Classification Search
None
See application file for complete search history.

(56) References Cited

U.S. PATENT DOCUMENTS

2006/0247355 A1    11/2006  Kosaka et al.
2012/0189859 A1*   7/2012   Nozaki ................... B32B 15/08
                                                          428/458
(Continued)

FOREIGN PATENT DOCUMENTS

CN    103319853 A      9/2013
EP    2058366 A1 *     5/2009  ............. B82Y 30/00
(Continued)

OTHER PUBLICATIONS

Dakin—Epoxy resins in electrical apparatus—IEEE Trans.Elect. Insul.—1974 (Year: 1974).*
(Continued)

*Primary Examiner* — John Vincent Lawler
(74) *Attorney, Agent, or Firm* — Knobbe, Martens, Olson & Bear, LLP (57) ABSTRACT

An object of the present invention is to provide an improved partial discharge-resistant electrical insulating resin compo-
(Continued)

sition that can inhibit deterioration of an insulator due to partial discharge. The partial discharge-resistant electrical insulating resin composition of the present invention comprises boehmite alumina and a resin.

13 Claims, 2 Drawing Sheets

(51) Int. Cl.
  C08K 3/22 (2006.01)
  C08L 101/00 (2006.01)
  H01B 3/30 (2006.01)
  H01B 3/00 (2006.01)
  C09D 5/00 (2006.01)
  H01B 3/12 (2006.01)
  H01B 3/40 (2006.01)
  H01B 3/42 (2006.01)
  H01B 3/44 (2006.01)

(52) U.S. Cl.
  CPC ............ H01B 3/002 (2013.01); H01B 3/30 (2013.01); H01B 7/02 (2013.01); C08K 2003/2227 (2013.01); C08K 2201/003 (2013.01); C08K 2201/011 (2013.01); H01B 3/12 (2013.01); H01B 3/302 (2013.01); H01B 3/305 (2013.01); H01B 3/306 (2013.01); H01B 3/40 (2013.01); H01B 3/421 (2013.01); H01B 3/427 (2013.01); H01B 3/44 (2013.01)

(56) References Cited

U.S. PATENT DOCUMENTS

| | | | |
|---|---|---|---|
| 2012/0247807 A1 | 10/2012 | Hanawa et al. | |
| 2013/0245161 A1 | 9/2013 | Hsieh et al. | |

FOREIGN PATENT DOCUMENTS

| | | | | |
|---|---|---|---|---|
| JP | 63-029409 A | | 2/1988 | |
| JP | S6329409 A | * | 2/1988 | ............ H01L 24/78 |
| JP | H0524824 B2 | * | 4/1993 | ............ B01J 13/00 |
| JP | 2006-328352 A | | 12/2006 | |
| JP | 2006328352 | * | 12/2006 | ............ B29C 43/02 |
| JP | 2003/002642 A | * | 1/2008 | ............ C01F 7/02 |
| JP | 2012-204270 A | | 10/2012 | |
| JP | 2014-040528 A | | 3/2014 | |
| JP | 2014-070168 A | | 4/2014 | |
| JP | 2014070168 | * | 4/2014 | ............ C08K 3/20 |
| KR | 2010-0012583 A | | 2/2010 | |
| TW | 201336919 A | | 9/2013 | |

OTHER PUBLICATIONS

Kataoka—JPS63-29409 A—MT—Filling agent for insulation material—ISR#3—1988 (Year: 1988).*
Tanaka—polymer nanocomposites as dielectrics & insulation—future applications—IEEE Trans.Diel.Elec.Insul.—2004 (Year: 2004).*
Kozako—epoxy-alumina nanocomposites—Interl.Symp.Elect. Insulating—2005 (Year: 2005).*
Kosaka—JP 2006-328352 A—MT—insulating resin w-aluminum filler—ISR #5 —2006 (Year: 2006).*
Krivda—epoxy nanocomposites for power engineering—IEEE Elec. Insul.Mag—2012 (Year: 2012).*
Sekito—JP 2014-070168 A—MT—resin composition for insulating film—ISR #4—2014 (Year: 2014).*
Aervoe—insulating-epoxy-coating-us—Safety Data Sheet—2015 (Year: 2015).*
Synthesia International—High-density polyurethanes—Data—2019 (Year: 2018).*
Nabaltec APYRAL® AOH 60 AlO(OH) Boehmite—MatWeb (Year: 2018).*
Ando—JP H05-24824—MT—alumina—anti-static—1993 (Year: 1993).*
Okamoto—high-temp discharge of polyimide vs epoxy—+cite—IEEE—1995 (Year: 1995).*
Katz—high-temp polyimide for discharge—IEEE Elect.Insul.Mag. 1997 (Year: 1997).*
Wu—nanosized alumina-polyimide hybrid films—Euro.Poly.J.—2005 (Year: 2005).*
Lizhu—alumina on polyimide-alumina composites—+Cite—7th Internl. Forum on Strat.Tech—IEEE—2012 (Year: 2012).*
Phillips—electrolytically formed polyimide films—J.Electrochem. Soc.—1972 (Year: 1972).*
Hirai—JP 2003-002642 A—MT—plate-like boehmite alumina—2003 (Year: 2003).*
International Search Report in International Application No. PCT/JP2016/070161 dated Aug. 16, 2016 (in 2 pages).
Kozako, et al. 2008 "Preliminary Discussion of Thermal Conductivity and Electrical Insulation Properties of Epoxy Resin Filled with Nano/Micro Mixed Fillers" *The Institute of Electrical Engineers of Japan*; 103-107.
Kozako, et al. 2012 "Fundamental Investigation of Preparation and Characteristics of Nano-scale Boehmite Alumina Filled Silicone Rubber for Outdoor Insulation" *The Institute of Electrical Engineers of Japan* 132(3): 257-262.
Ohta & Iida 2014 "Effect of Magnesium Hydroxide on Voltage Lifetime of Epoxy Composites" *Transactions of Fundamentals and Materials* 134(5): 327-333.
Ozaki, et al. 2004 "Functional Insulating Materials Using Nanoparticle Dispersion Technique" *Toshiba Review* 59(7): 48-51.
Office Action in Corresponding Chinese Application No. 201680038905. 5, dated Feb. 27, 2019.
Katayama, J. et al. "Comparison of the effects of nanofiller materials on the dielectric properties of epoxy nanocomposites" 2011 Annual Report/Conference on Electrical Insulation and Dielectric Phenomena (CEIDP 2011): Oct. 16, 2011 (Oct. 16, 2011), pp. 318-321.
Kozako, M. et al. 2006 "Preparation and various characteristics of epoxy/alumina nanocomposites" IEEJ Transactions on Fundamentals and Materials, vol. 126, No. 11, pp. 1121-1127.
Liu, L. et al. 2012 "The effects of Al2O3 contents on the morphology and electrical properties of polyimide/nano-Al2O3 composite films" Strategic Technology (IFOST), 2012 7th International Forum On, IEEE, Sep. 18, 2012 (Sep. 18, 2012), pp. 1-4.
Supplementary European Search Report in corresponding European Application No. EP 16 82 1468, dated Dec. 14, 2018.
Office Action issued for counterpart Taiwanese Patent Application No. 105121798 (dated Feb. 27, 2019) (English translation not available).
Office Action, in corresponding EP Patent Application No. 16 821 468.2, dated Jun. 16, 2020.
Zhou Hong, et al., "Preparation and Characterization of Boehmite/Polyimide Nanocomposite Films," Journal of the Chinese Ceramic Society, vol. 37, No. 8: 1288-1292, Aug. 2009.

* cited by examiner

ELECTRICAL INSULATING RESIN COMPOSITION FOR PARTIAL-DISCHARGE RESISTANCE

TECHNICAL FIELD

The present invention relates to a partial discharge-resistant electrical insulating resin composition with good partial discharge resistance, a method for producing the composition, as well as an insulating varnish, an electrodeposition paint, a cured product, an electric wire, a rotating electric machine, an insulating film, and an insulating coating produced with the partial discharge-resistant electrical insulating resin composition.

BACKGROUND ART

Along with the recent growing awareness of energy conservation, the number of electrical apparatuses in which inverter control is performed (e.g., household appliances such as air-conditioners, refrigerators, fluorescent lamps, and electromagnetic cookers; automobiles; electric trains; and elevators) has increased. Inverter control is a control method in which an inverter is used to control the speed of an electric motor or the like through a variable voltage variable frequency AC power supply. An inverter is an efficient variable-speed voltage controller, which is controlled by high-speed switching elements operating at several to several hundreds of kHz. At the time of voltage application, such an inverter may cause a high voltage surge to be generated.

As materials forming the coils of electrical apparatuses in which this inverter control is performed, insulated electric wires whose conductors are coated with insulating coatings, such as enameled wires, are commonly used. In such an insulated electric wire, partial discharge may occur due to the occurrence of an abrupt overvoltage caused by the inverter control (inverter surge). The "partial discharge" refers to an event (discharge phenomenon) in which a weak electric spark occurs in an insulator or microvoids (gaps) between the conductor and the insulator. If partial discharge occurs in an insulated electric wire, the insulator may be broken, ultimately leading to a breakdown in which insulation cannot be maintained. This may result in a very short lifetime of the insulated electric wire.

CITATION LIST

Patent Literature

Patent Literature 1: JP 2012-204270 A
Patent Literature 2: JP 2014-040528 A

Non Patent Literature

Non Patent Literature 1: TOSHIBA REVIEW Vol. 59, No. 7 (2004)
Non Patent Literature 2: Tsukasa OHTA, Kazuo IIDA, "Effect of Magnesium Hydroxide on Withstand Voltage Lifetime of Epoxy Composites", 2014, IEEJ Transactions on Fundamentals and Materials, Vol. 134, No. 5, pp. 327-333

SUMMARY OF INVENTION

Technical Problem

Possible causes of such a deterioration of an insulator due to partial discharge are considered to be as follows: 1) deterioration of the insulating material caused by cleavage of the main chain of a resin due to a collision between charged particles from partial discharge; 2) dissolution or chemical decomposition of the insulating material caused by a local increase in temperature due to partial discharge; and 3) deterioration of the insulating material caused by a secondary product such as ozone formed by partial discharge.

Various methods are known for inhibiting deterioration of an insulator due to partial discharge.

Among the above-listed three causes, with regard to the cause 1), it is known that cleavage of the main chain of a resin due to partial discharge can be inhibited by dispersing a filler into the resin (referred to as a "barrier effect"). For example, Patent Literature 1 discloses using spherical silica particles as a filler, and Non Patent Literature 1 discloses using a flat layered silicate (cation-exchange clay) as a filler. These methods, however, cannot solve the causes 2) and 3), although they can inhibit the cause 1). In particular, when the voltage is high, these methods fail to sufficiently inhibit deterioration of an insulator due to partial discharge.

Patent Literature 2 and Non Patent Literature 2 disclose methods in which a metal hydroxide such as magnesium hydroxide as a filler is dispersed in a resin, such that the filler releases water when it is subject to partial discharge to reduce heat generation due to partial discharge. These methods can inhibit the cause 2), and simultaneously reduce the formation of a secondary product caused by a temperature increase set forth in 3).

However, for example, a metal hydroxide has a barrier effect smaller than that of the spherical silica particles disclosed in Patent Literature 1 or the layered silicate disclosed in Non Patent Literature 1, and hence, is less effective against the cause 1). Moreover, because a metal hydroxide is strongly alkaline, it may accelerate deterioration of the resin in which it is mixed. Furthermore, the method using magnesium hydroxide or the like disclosed in Non Patent Literature 2 involves simply mixing aggregated particles of magnesium hydroxide into a resin; thus, the dispersed state of the particles is uneven, and it is necessary to increase the volume of the filler to achieve a sufficient effect. Furthermore, in the method using a metal hydroxide or a metal carbonate disclosed in Patent Literature 2, a very fine filler is used, and the dispersed state of the filler is improved; however, aggregation of particles still occurs, and a sufficient effect is not achieved.

As described above, deterioration of an insulator due to partial discharge leads to a breakdown, and this problem has not yet been sufficiently solved. Thus, there is a need for the development of an insulator with superior partial discharge resistance. Additionally, the problem of a breakdown due to partial discharge is found not only in electric wires, but also in insulating films such as interphase insulating sheets for electric motors; insulating varnishes for coating and fixing the outer layer of motor coils; insulating electric wires for electric power apparatuses such as power generators, transformers, and switchgears; filling-molded insulating members for electric power apparatuses such as transformers and switchgears; and the like. Thus, there is a need for the development of an improved partial discharge-resistant material applicable to insulators for a wide range of applications.

As used herein, the "breakdown" refers to the phenomenon in which when the voltage applied to an insulator exceeds a certain limit, the insulator is electrically broken to lose its insulating properties, and causes current to flow.

A main object of the present invention is to provide an improved partial discharge-resistant electrical insulating resin composition that can solve all of the aforementioned causes 1) to 3), and inhibit deterioration of an insulator due to partial discharge. Another object of the present invention is to provide a method for producing such an improved partial discharge-resistant electrical insulating resin composition, as well as an insulating varnish, an electrodeposition paint, a cured product, an electric wire, a rotating electric machine, an insulating film, and an insulating coating produced with the resin composition.

Solution to Problem

As a result of extensive research to solve the aforementioned problem, the present inventors have found that a resin composition comprising boehmite alumina and a resin serves as a partial discharge-resistant electrical insulating resin composition with good partial discharge resistance. The present inventors have also found that the partial discharge-resistant electrical insulating resin composition of the present invention can favorably inhibit deterioration of an insulator due to partial discharge caused by an inverter surge. Furthermore, the present inventors have found that through the step of pre-gelling the boehmite alumina in the production of the partial discharge-resistant electrical insulating resin composition of the present invention, the partial discharge-resistant electrical insulating resin composition can have superior partial discharge resistance.

The present invention has been completed as a result of further study based on these findings.

In summary, the present invention provides the following aspects of the invention:

Item 1. A partial discharge-resistant electrical insulating resin composition comprising boehmite alumina and a resin.

Item 2. The partial discharge-resistant electrical insulating resin composition according to item 1, wherein the boehmite alumina is nanoparticles.

Item 3. The partial discharge-resistant electrical insulating resin composition according to any one of items 1 to 3, wherein the resin is at least one resin selected from the group consisting of polyvinyl formal resin, polyurethane resin, polyamide resin, polyester resin, polyimide resin, polyamide-imide resin, polyetherimide resin, polyester-imide resin, and epoxy resin.

Item 4. The partial discharge-resistant electrical insulating resin composition according to any one of items 1 to 3, wherein a content of the boehmite alumina is 0.1 to 60% by mass.

Item 5. The partial discharge-resistant electrical insulating resin composition according to any one of items 1 to 4, which is resistant to an inverter surge.

Item 6. The partial discharge-resistant electrical insulating resin composition according to any one of items 1 to 5, which is for use with an electrical apparatus in which inverter control is performed.

Item 7. An insulating varnish comprising the partial discharge-resistant electrical insulating resin composition according to any one of items 1 to 6 and a solvent.

Item 8. An electrodeposition paint comprising the partial discharge-resistant electrical insulating resin composition according to any one of items 1 to 6 and a solvent.

Item 9. A cured product formed from the partial discharge-resistant electrical insulating resin composition according to any one of items 1 to 6.

Item 10. A method for producing the partial discharge-resistant electrical insulating resin composition according to any one of items 1 to 6, comprising the steps of pre-gelling the boehmite alumina; and mixing the pre-gelled boehmite alumina with the resin.

Item 11. An electric wire comprising a conductor; and an insulating coating comprising a single layer or a plurality of layers formed on an outer periphery of the conductor, at least one layer of the insulating coating comprising the partial discharge-resistant electrical insulating resin composition according to any one of items 1 to 6 or a cured product thereof.

Item 12. A rotating electric machine comprising the electric wire according to item 11.

Item 13. An insulating film comprising an insulating layer comprising the partial discharge-resistant electrical insulating resin composition according to any one of items 1 to 6 or a cured product thereof.

Item 14. An insulating coating comprising an insulating layer comprising the partial discharge-resistant electrical insulating resin composition according to any one of items 1 to 6 or a cured product thereof.

Item 15. Use of a resin composition comprising boehmite alumina and a resin for inhibiting deterioration due to partial discharge.

Item 16. An insulating article comprising a partial discharge-resistant electrical insulating resin composition comprising boehmite alumina and a resin.

Advantageous Effects of Invention

The present invention can provide a partial discharge-resistant electrical insulating resin composition with good partial discharge resistance, as well as an insulating varnish, an electrodeposition paint, a cured product, an electric wire, a rotating electric machine, an insulating film, and an insulating coating produced with the resin composition. Furthermore, the use of the partial discharge-resistant electrical insulating resin composition can increase the lifetime of coils of rotating electric machines such as motors and power generators; insulating films such as interphase insulating sheets; insulating varnishes for coating and fixing the outer layer of motor coils; and insulating members for electric power apparatuses such as transformers and switchgears.

DESCRIPTION OF EMBODIMENTS

1. Partial Discharge-Resistant Electrical Insulating Resin Composition

The electrical insulating resin composition of the present invention, which is resistant to partial discharge, comprises boehmite alumina and a resin. The partial discharge-resistant electrical insulating resin composition of the present invention will be hereinafter described in detail.

(Boehmite Alumina)

The partial discharge-resistant electrical insulating resin composition of the present invention contains boehmite alumina.

The "boehmite alumina" refers to aluminum oxyhydroxide (AlOOH) or hydrated alumina ($Al_2O_3 \cdot H_2O$). Boehmite alumina is broadly classified into pseudocrystalline boehmite and microcrystalline boehmite according to the degree of crystallinity, crystal size, or crystal structure. In the present invention, either type of boehmite alumina can be used, as desired.

Pseudocrystalline boehmite, also referred to as pseudoboehmite, typically has a very large surface area, as well as a large pore and a large pore volume, and has a low specific gravity. Compared to microcrystalline boehmite, pseudocrystalline boehmite has a smaller crystal size, and contains more hydrated water molecules per crystal.

Microcrystalline boehmite has a high degree of crystallinity, a relatively large crystal size, a very small surface area, and a high specific gravity.

Both types of boehmite alumina can be equally used herein, and the boehmite alumina used in the present invention includes both pseudocrystalline boehmite and microcrystalline boehmite.

Because the partial discharge-resistant electrical insulating resin composition of the present invention contains boehmite alumina and a resin, it exhibits good partial discharge resistance. Details of this mechanism, though not necessarily clear, can be believed to be as follows, for example:

It is presumed that when the boehmite alumina contained in the partial discharge-resistant electrical insulating resin composition is subject to partial discharge, it releases water to efficiently absorb thermal energy, thereby effectively inhibiting deterioration of the resin due to thermal energy (temperature increase) from the partial discharge.

Moreover, it is believed that because the boehmite alumina has the property of releasing water, it suppresses heat generation due to partial discharge. Consequently, it is presumed that the boehmite alumina can suppress a temperature increase to efficiently inhibit the formation of a secondary product such as ozone.

Furthermore, it is presumed that because the boehmite alumina turns into alumina after releasing water, it maintains a high barrier effect. It is also presumed that because adjacent particles of the boehmite alumina aggregate and become bound together when they turn into alumina, even after the resin component of a portion of the surface is eroded by partial discharge, the remaining layer forms a rigid alumina layer to maintain a high barrier effect.

The boehmite alumina may have a known shape such as a plate, rod, or needle shape, without being limited to a particular shape; the boehmite alumina is preferably plate-like particles to achieve superior partial discharge resistance of the partial discharge-resistant electrical insulating resin composition of the present invention.

The boehmite alumina is preferably nanoparticles. The "nanoparticles" refers to nanosized particles, and specifically, particles with an average particle diameter of about 1 nm to 1 μm.

The "nanoparticles" also includes particles whose average particle diameter in at least the width direction or thickness is about 1 nm to 1 μm when the boehmite alumina has a flat structure, for example.

The boehmite alumina preferably has an average particle diameter of 1 nm to 5 μm, and more preferably 5 to 500 nm, from the viewpoint of achieving superior partial discharge resistance of the partial discharge-resistant electrical insulating resin composition of the present invention. The average particle diameter refers to the particle diameter at a cumulative value of 50% in the particle size distribution measured with a laser diffraction scattering-type particle size measurement apparatus (Microtrac).

The boehmite alumina preferably has an aspect ratio (length/width) of 2 or more, more preferably 4 to 100, and still more preferably 5 to 100. When the boehmite alumina has an aspect ratio of 2 or more, it can be aligned regularly in a direction opposed to erosion due to partial discharge, and can thereby provide an increased area of the conductor to be covered to increase the effect of partial discharge resistance, the case where the partial discharge-resistant electrical insulating resin composition of the present invention is applied onto a conductor.

As used herein, the "aspect ratio" refers to a ratio of the length to the width (length/width) of particles observed with a scanning electron microscope at 5000× magnification. Specifically, when boehmite alumina composed of plate-like particles, the aspect ratio is determined by dividing the average value of particle diameters of plate-like particles by the average value of plate thicknesses of the plate-like particles; specifically, by dividing the average value of particle diameters of at least 100 plate-like particles of the boehmite alumina, by the average value of plate thicknesses of the plate-like particles. As used herein, the particle diameter of a plate-like particle corresponds to the diameter of a circle having the same area as that of a main surface of a plate-like particle. In the case of rod- or needle-like particles, the aspect ratio is determined by dividing the length of a needle (rod) by the diameter of the needle (rod).

A commercially available product may be used as the boehmite alumina in the present invention. Examples of commercially available products that can be used in the present invention include "Alumina sol-15A", "Alumina sol-10A" and "Alumina sol-10D" from Kawaken Fine Chemicals Co., Ltd.; and "AS-520" from Nissan Chemical Industries, Ltd.

The boehmite alumina may be a surface-modified product. The surface modification of the boehmite alumina may be accomplished using a known method such as an organic surface treatment with a silane coupling agent or a titanate coupling agent, for example. Examples of preferred surface modifiers include silane coupling agents.

The content of the boehmite alumina in the partial discharge-resistant electrical insulating resin composition is preferably 0.1 to 60% by mass, and more preferably 1 to 60% by mass. When the content of the boehmite alumina is 0.1 to 60% by mass, a resin composition having superior partial discharge resistance can be achieved. The lower limit of the content of the boehmite alumina is more preferably 2% by mass, and still more preferably 5% by mass. The upper limit of the content of the boehmite alumina is more preferably 50% by mass, and still more preferably 40% by mass.

(Resin)

The resin to be used in the partial discharge-resistant electrical insulating resin composition of the present invention is not limited to particular resins, as long as it is commonly used as insulating materials, and does not inhibit the boehmite alumina from dispersing in the resin. Examples of such resins include polyvinyl formal resin, polyesterimide resin, polyurethane resin, polyamide resin, polyester resin, polyimide resin, polyamide-imide resin, acrylic resin, polyvinyl fluoride resin, polyethylene resin, polyetheretherketone resin, fluoro resin, polyethersulfone resin, polyetherimide resin, polyester-imide resin, epoxy resin, silicone resin, polyphenylene sulfide resin, phenol resin, lignin resin, polylactic resin, polydicyclopentadiene resin, polytricyclopentadiene resin, and combinations of two or more of these resins.

In particular, from the viewpoint of allowing the boehmite alumina to be dispersed well, and allowing the partial discharge resistance to be further improved, the resin is preferably at least one resin selected from the group consisting of polyvinyl formal resin, polyurethane resin, polyamide resin, polyester resin, polyimide resin, polyamide-imide resin, polyetherimide resin, polyester-imide resin, and epoxy resin, and is more preferably at least one resin selected from the group consisting of polyamide-imide resin, polyester-imide resin, polyimide resin, and polyetherimide resin.

The content of the resin in the partial discharge-resistant electrical insulating resin composition is preferably 30 to 99% by mass, and more preferably 60 to 95% by mass.

(Other Components)

The partial discharge-resistant electrical insulating resin composition of the present invention, which contains the boehmite alumina and the resin, may further optionally contain other components.

Examples of other components include commonly known additives used in electrical insulating resin compositions, such as other resins and inorganic fillers. Examples of additives include tackifiers such as alkylphenol resin, alkylphenol-acetylene resin, xylene resin, coumarone-indene resin, terpene resin, and rosin; bromine-based flame retardants such as polybromodiphenyl oxide and tetrabromobisphenol A; chlorine-based flame retardants such as chlorinated paraffins and perchlorocyclodecane; phosphate-based flame retardants such as phosphates and halogen-containing phosphates; boron-based flame retardants; oxide-based flame retardants such as antimony trioxide; phenol-based, phosphorus-based, and sulfur-based antioxidants; inorganic fillers including silica, layered silicates, aluminum oxide, magnesium oxide, boron nitride, silicon nitride, and aluminum nitride; common plastic compounding components such as thermal stabilizers, photostabilizers, UV absorbents, lubricants, pigments, cross-linking agents, cross-linking aids, silane coupling agents, and titanate coupling agents; and aromatic polyamide fibers. The electrical insulating resin composition may contain, for example, 0.1 to 10% by mass of these additives.

2. Method for Producing Partial Discharge-Resistant Electrical Insulating Resin Composition The partial discharge-resistant electrical insulating resin composition of the present invention can be produced by mixing the boehmite alumina, the resin, and optionally additives, using a commonly known method. Mixing may be performed with heating, as required. Mixing may be accomplished using commonly known mixing means including, for example, a kneader, a pressurizing kneader, a mixing roll, a Banbury mixer, a twin-screw extruder, a planetary centrifugal mixer, and a homogenizing mixer.

The boehmite alumina may be ground before being mixed with the resin. Because the ground boehmite alumina is smaller and uniform in particle diameter, upon mixing with the resin, the boehmite alumina is dispersed well in the resin, which allows the partial discharge resistance of the resulting resin composition to be further improved. Grinding may be accomplished using commonly known grinding means including, for example, a ball mill, a rod mill, a mass-colloider, a dry jet mill, a homogenizer, and a wet jet mill.

To form a composite by mixing the boehmite alumina and the resin, the boehmite alumina may be directly dispersed in the resin; however, it is preferred to prepare a pre-gel in which the boehmite alumina is dispersed in an organic solvent or water, and then disperse the pre-gel in the resin.

By preparing the pre-gel and then mixing it with the resin, a composite between the boehmite alumina and the resin in which the boehmite alumina is dispersed better can be formed.

That is, the method for producing the partial discharge-resistant electrical insulating resin composition of the present invention preferably includes:

step (1) of pre-gelling the boehmite alumina; and step (2) of mixing the pre-gelled boehmite alumina with the resin.

Because the boehmite alumina is pre-gelled before being mixed with the resin, upon mixing with the resin, the boehmite alumina can be dispersed better in the resin, which allows the partial discharge resistance of the resulting resin composition to be further improved.

In step (1), the boehmite alumina may be pre-gelled by, for example, dispersing the boehmite alumina in an organic solvent or water.

Examples of organic solvents in which the boehmite alumina is to be dispersed include polar solvents such as N-methyl-2-pyrrolidone, N,N-dimethylacetamide, N,N-dimethylformamide, methanol, ethanol, and propanol; and mixed solvents obtained by adding water to these polar solvents.

To pre-gel the boehmite alumina, it is preferred to disperse 1 to 100 parts by mass of the boehmite alumina in 100 parts by mass of an organic solvent, water, or a mixed solvent. The boehmite alumina may be dispersed using a common stirring means such as a mixer, for example. The conditions under which the boehmite alumina is dispersed, such as the stirring rate, may be selected as appropriate depending on the solvent.

Next, in step (2), the pre-gelled boehmite alumina is mixed with the resin. The pre-gelled boehmite alumina may be mixed with the resin, using the commonly known mixing means described above. Defoaming is preferably performed during mixing. The conditions under which mixing is performed may be selected as appropriate depending on the solvent.

The method for producing the partial discharge-resistant electrical insulating resin composition of the present invention may further include the step of mixing other components into the mixture of the pre-gelled boehmite alumina and the resin obtained in step (2).

3. Use

The partial discharge-resistant electrical insulating resin composition of the present invention has good partial discharge resistance. Thus, the partial discharge-resistant electrical insulating resin composition of the present invention can be suitably used as an insulating material of an insulator in which partial discharge resistance is demanded. In particular, the partial discharge-resistant electrical insulating resin composition of the present invention can favorably inhibit deterioration of an insulator due to partial discharge caused by an inverter surge. Thus, the partial discharge-resistant electrical insulating resin composition of the present invention is preferably used for inverter surge-resistant applications.

The partial discharge-resistant electrical insulating resin composition of the present invention is also preferably used in electrical apparatuses (such as motors) in which inverter control is performed. The partial discharge-resistant electrical insulating resin composition of the present invention may be used in an electrical apparatus in which inverter control is performed, by, for example, applying, to the electrical apparatus, an insulated electric wire whose conductor is coated with the partial discharge-resistant electrical insulating resin composition of the present invention, or an insulating sheet formed using the partial discharge-resistant electrical insulating resin composition of the present invention.

A cured product formed from the partial discharge-resistant electrical insulating resin composition of the present invention similarly has good partial discharge resistance. Such a cured product is obtained by, for example, using a curable resin as the resin contained in the partial discharge-resistant electrical insulating resin composition of the present invention, optionally with a curing agent, and curing the electrical insulating resin composition of the present invention.

The curable resin is not limited to particular resins, and may be a known curable resin such as a thermally curable resin or UV curable resin from the examples of resins mentioned in the resin section above. The curing agent may be selected as appropriate from known curing agents, in accordance with the curable resin used. Curing may be accomplished using a known curing means that is selected as appropriate from drying, heating, and UV irradiation, for example, in accordance with the curable resin used.

Examples of applications of the partial discharge-resistant electrical insulating resin composition of the present invention include an insulating varnish and an electrodeposition paint. For example, an insulating varnish or an electrodeposition paint can be prepared using the partial discharge-resistant electrical insulating resin composition of the present invention, and then used to coat the surface of a member such as a conductor, thereby imparting good partial discharge resistance to the member.

4. Insulating Varnish

An insulating varnish comprising the partial discharge-resistant electrical insulating resin composition of the present invention and a solvent can exhibit good partial discharge resistance.

The solvent is not limited to particular solvents as long as it is a known organic solvent conventionally used in an insulating varnish. Specific examples of such solvents include water; polar organic solvents such as N-methyl-2-pyrrolidone, N,N-dimethylacetamide, N,N-dimethylformamide, dimethylsulfoxide, tetramethylurea, hexaethylphosphoric triamide, and γ-butyrolactone; ketones such as acetone, methyl ethyl ketone, methyl isobutyl ketone, and cyclohexanone; esters such as methyl acetate, ethyl acetate, butyl acetate, and diethyl oxalate; ethers such as diethyl ether, ethylene glycol dimethyl ether, diethylene glycol monomethyl ether, ethylene glycol monobutyl ether (butyl cellosolve), diethylene glycol dimethyl ether, and tetrahydrofuran; hydrocarbons such as hexane, heptane, benzene, toluene, and xylene; halogenated hydrocarbons such as dichloromethane and chlorobenzene; phenols such as cresol and chlorophenol; tertiary amines such as pyridine; and alcohols such as methanol, ethanol, and propanol. These solvents may be used alone or as a mixture of two or more.

The blending ratio of the partial discharge-resistant electrical insulating resin composition of the present invention and the solvent is not particularly limited, and may be selected as appropriate within the range of proportions where the resulting product can be used as an insulating varnish. Typically, the partial discharge-resistant electrical insulating resin composition and the solvent may be blended such that the proportion of nonvolatile components in the insulating varnish is 5 to 60% by mass.

5. Electrodeposition Paint

An electrodeposition paint comprising the partial discharge-resistant electrical insulating resin composition of the present invention and a solvent can exhibit good partial discharge resistance.

The solvent is not limited to particular solvents as long as it is a known solvent conventionally used in an electrodeposition paint. Examples of such solvents include water; amide-based solvents such as N,N-dimethylformamide, N,N-dimethylacetamide, and N-methyl-2-pyrrolidone; alcohol-based solvents such as methanol, ethanol, propanol, butanol, methoxy propanol, and benzyl alcohol; polyhydric alcohol-based solvents such as ethylene glycol, diethylene glycol, triethylene glycol, glycerol, propylene glycol, dipropylene glycol, and methylpropanediol; ether-based solvents such as dimethyl ether, diethyl ether, dipropyl ether, dibutyl ether, tetrahydrofuran, diethylene glycol, diethylene glycol dimethyl ether, and triethylene glycol; ester-based solvents such as butyl acetate, ethyl acetate, isobutyl acetate, propylene glycol methyl acetate, ethyl cellosolve, butyl cellosolve, 2-methylcellosolve acetate, ethyl cellosolve acetate, butyl cellosolve acetate, γ-butyrolactone, γ-valerolactone, δ-valerolactone, γ-caprolactone, ε-caprolactone, and α-methyl-γ-butyrolactone; ketone-based solvents such as acetone, methyl ethyl ketone, methyl isobutyl ketone, diisobutyl ketone, cyclopentanone, cyclohexanone, and acetophenone; carbonate-based solvents such as diethyl carbonate and propylene carbonate; hydrocarbon-based solvents such as hexane, heptane, octane, benzene, toluene, and xylene; phenol-based solvents such as phenol, m-cresol, p-cresol, 3-chlorophenol, and 4-chlorophenol; and other solvents such as 1,3-dimethyl-2-imidazolidinone, dimethyl sulfoxide, sulfolane, turpentine, mineral spirits, and petroleum naphtha-based solvents. These solvents may be used alone or as a mixture of two or more.

A known resin conventionally used in an electrodeposition paint may be used as the resin contained in the partial discharge-resistant electrical insulating resin composition of the present invention.

The blending ratio of the partial discharge-resistant electrical insulating resin composition of the present invention and the solvent is not particularly limited, and may be selected as appropriate within the range of proportions where the resulting product can be used as an electrodeposition paint. Typically, the partial discharge-resistant electrical insulating resin composition and the solvent may be blended such that the proportion of nonvolatile components in the electrodeposition paint is 1 to 60% by mass.

Other examples of applications of the partial discharge-resistant electrical insulating resin composition of the present invention include an electric wire, a rotating electric machine, an insulating film, and an insulating coating in which the partial discharge-resistant electrical insulating resin composition of the present invention or a cured product thereof is used as a portion or all of the insulator. That is, the present invention also provides an insulating article comprising a partial discharge-resistant electrical insulating resin composition comprising boehmite alumina and a resin. Examples of such insulating articles include an electric wire, a rotating electric machine, an insulating film, and an insulating coating.

6. Electric Wire

The partial discharge-resistant electrical insulating resin composition of the present invention is applicable to an insulated electric wire. When the partial discharge-resistant electrical insulating resin composition of the present invention is applied to an insulator for an electric wire, an insulated electric wire with good partial discharge resistance can be obtained, leading to an improved insulation lifetime of the electric wire.

That is, the present invention also provides an electric wire comprising a conductor and an insulating coating comprising a single layer or a plurality of layers formed on an outer periphery of the conductor, at least one layer of the insulating coating comprising the partial discharge-resistant electrical insulating resin composition or a cured product thereof.

Examples of materials of the conductor include metal materials such as copper, aluminum, and silver.

The insulating coating comprises a single layer or a plurality of layers formed on the outer periphery of the conductor. In the electric wire of the present invention, at least one layer of the insulating coating comprises the partial discharge-resistant electrical insulating resin composition or a cured product thereof.

Examples of other layers of the insulating coating include layers formed of polyamide-imide resin or polyester-imide resin.

The electric wire of the present invention may be produced by, for example, applying a dispersion liquid containing the partial discharge-resistant electrical insulating resin composition onto the surface of a conductor, or onto another layer that coats the conductor to form an insulating coating by baking, for example.

7. Rotating Electric Machine

The partial discharge-resistant electrical insulating resin composition of the present invention is applicable to a rotating electric machine.

That is, the rotating electric machine of the present invention is a rotating electric machine produced using the above-described electric wire.

Examples of such rotating electric machines include motors and power generators (generators).

8. Insulating Film

The partial discharge-resistant electrical insulating resin composition of the present invention is also applicable to an insulating film. That is, the insulating film of the present invention is an insulating film comprising an insulating layer comprising the partial discharge-resistant electrical insulating resin composition or a cured product thereof.

The insulating film may be formed of a single layer, or may have a base material and the insulating layer formed on the base material.

The insulating film formed of a single layer may be produced, for example, as follows: The partial discharge-resistant electrical insulating resin composition of the present invention is molded into a sheet by extrusion molding. Alternatively, the partial discharge-resistant electrical insulating resin composition of the present invention is dissolved or dispersed in a solvent, as required, and then applied onto a base material such as polyethylene terephthalate to form an insulating layer by heating, drying, or curing the resin composition, as required; subsequently, the base material is removed.

The thickness of the insulating film is preferably 2 to 300 µm, and more preferably 5 to 200 µm, for example. If the thickness is less than 2 µm, the insulating film may develop a defect during production. If the thickness exceeds 300 µm, the flexibility required in the insulating film may be lost.

The insulating film having a base material and the insulating layer formed on the base material may be produced, for example, as follows: The partial discharge-resistant electrical insulating resin composition of the present invention is dissolved or dispersed in a solvent, as required, and then applied onto a base material to form an insulating film by heating, drying, or curing the resin composition, as required.

Examples of base materials include synthetic resins such as polyethylene terephthalate, polyethylene naphthalate, polyester, polyethylene, and polypropylene.

When the insulating film having a base material and an insulating layer, the thickness of the insulating layer is preferably 2 to 300 µm, and more preferably 5 to 200 µm, for example. If the thickness is less than 2 µm, the insulating film may develop a defect during production. If the thickness exceeds 300 µm, the flexibility required in the insulating film may be lost.

The thickness of the base material is, for example, 2 to 300 µm, and preferably 5 to 200 µm, although not limited thereto.

9. Insulating Coating

The partial discharge-resistant electrical insulating resin composition of the present invention is also applicable to an insulating coating such as a solder resist for use with an electronic substrate or the like. That is, the insulating coating of the present invention is an insulating coating comprising an insulating layer comprising the partial discharge-resistant electrical insulating resin composition or a cured product thereof.

The thickness of the insulating coating is preferably 2 to 300 µm, and more preferably 5 to 200 µm. If the thickness is less than 2 µm, the insulating coating may develop a defect during production. If the thickness exceeds 300 µm, an effect commensurate with the amount used cannot be obtained, which is uneconomical.

The insulating coating of the present invention may be produced, for example, as follows: The partial discharge-resistant electrical insulating resin composition of the present invention is melted by heating and then applied to the surface of an article to be coated such as an electronic substrate, and is molded to form an insulating layer. Alternatively, the partial discharge-resistant electrical insulating resin composition of the present invention is used as an electrodeposition paint to form an insulating layer by electrodeposition on an article to be coated. Alternatively, the partial discharge-resistant electrical insulating resin composition of the present invention is dissolved or dispersed in a solvent, as required, and then applied to an article to be coated to form an insulating layer by heating, drying, or curing the resin composition, as required.

When a gap in the base material, rather than the surface, is filled with the resin composition, a molded member can be obtained.

Examples of articles to be coated include metal materials such as copper, aluminum, and silver.

As described above, because the partial discharge-resistant electrical insulating resin composition of the present invention has good partial discharge resistance, the application of the resin composition to an insulator in which partial discharge resistance is demanded can increase the lifetime of an insulating member.

EXAMPLES

The present invention will be described more specifically below with reference to examples; however, the invention is not limited thereto.

Example 1

(1-1. Preparation of Pre-Gel of Boehmite Alumina)

10.0 g of a water dispersion of boehmite alumina ("Alumisol-15A" from Kawaken Fine Chemicals Co., Ltd.; 14.8% by mass; average particle diameter: 20 nm, aspect ratio: 50) and 8.5 g of N-methyl-2-pyrollidone (NMP) were placed in a plastic sealed vessel, and the mixture was stirred for 3 minutes using a planetary centrifugal mixer ("ARE-310" from THINKY CORPORATION) in the mixing mode (2000 rpm) to give a pre-gel in which the proportion of the boehmite alumina to the entire pre-gel was 8.0% by mass.

(1-2. Preparation of Polyamide Acid Varnish)

In a 1-L four-neck flask equipped with a stirrer and a thermometer, 73.2 g of 4,4'-diaminodiphenylether and 832 g of NMP were placed and then dissolved by heating to 50° C. with stirring. Next, 40 g of pyromellitic anhydride and 51 g of biphenyltetracarboxylic dianhydride were gradually added to the resulting solution. After the completion of the addition, the mixture was stirred for 1 hour to give a polyamide acid varnish in which an aromatic polyamide acid represented by the following formula (I) was dissolved in a first liquid, NMP, at a concentration of 16.4% by mass:

(I)

wherein n is an integer from 2 or more.

(1-3. Preparation of Insulating Varnish)

In a plastic sealed vessel, 4.9 g of the boehmite alumina pre-gel (boehmite alumina content: 8.0% by mass) prepared in 1-1 above and 45.0 g of the polyamide acid varnish (aromatic polyamide acid content: 7.4 g, NMP content: 37.6 g) prepared in 1-2 above were placed. The mixture was then stirred for 5 minutes using a planetary centrifugal mixer ("ARE-310" from THINKY CORPORATION) in the mixing mode (2000 rpm) and then for 5 minutes in the defoaming mode (2200 rpm) to give an insulating varnish containing the partial discharge-resistant electrical insulating resin composition. In the resulting insulating varnish, the proportion of nonvolatile components to the entire dispersion was 15.6% by mass, and the proportion of the boehmite alumina to the entire nonvolatile components was 5.0% by mass.

(1-4. Preparation of Insulating Film)

The insulating varnish obtained in 1-3 above was applied to a 100-μm-thick rectangular PET film, using a blade coater set at a groove depth of 550 μm. The PET film being kept in a horizontal position was dried in a forced air oven sequentially for 15 minutes at 70° C., 45 minutes at 90° C., and 10 minutes at 130° C. to form an insulating film on the PET film. This insulating film was removed from the PET film, and then heat-treated sequentially for 10 minutes at 150° C., 10 minutes at 200° C., 10 minutes at 250° C., and 60 minutes at 300° C. to give an insulating film composed of the boehmite alumina and polyimide resin. The content of the boehmite alumina in the entire film was 5.0% by mass, and the thickness of the film was 42 μm.

Example 2

(2-1. Preparation of Pre-Gel of Boehmite Alumina)

In a plastic sealed vessel, 10.0 g of an ethanol dispersion of plate-like boehmite alumina (10.0% by mass, average particle diameter: 20 nm, aspect ratio: 4) and 10.0 g of N-methyl-2-pyrrolidone (NMP) were placed, and the mixture was stirred for 3 minutes using a planetary centrifugal mixer ("ARE-310" from THINKY CORPORATION) in the mixing mode (2000 rpm) to give a pre-gel in which the proportion of the boehmite alumina to the entire pre-gel was 5.0% by mass.

(2-2. Preparation of Polyamide Acid Varnish)

In a 1-L four-neck flask equipped with a stirrer and a thermometer, 400 g of 4,4'-diaminodiphenylether and 4104 g of NMP were placed and then dissolved by heating to 50° C. with stirring. Next, 220 g of pyromellitic anhydride and 280 g of biphenyltetracarboxylic dianhydride were gradually added to the resulting solution. After the completion of the addition, the mixture was stirred for 1 hour to give a polyamide acid varnish in which the aromatic polyamide acid represented by formula (I) above was dissolved in the first liquid, NMP, at a concentration of 18.0% by mass.

(2-3. Preparation of Insulating Varnish)

In a plastic sealed vessel, 7.6 g of the boehmite alumina pre-gel (boehmite alumina content: 5.0% by mass) prepared in 2-1 above and 40.0 g of the polyamide acid varnish (aromatic polyamide acid content: 7.2 g, NMP content: 32.8 g) prepared in 2-2 above were placed. The mixture was then stirred for 5 minutes using a planetary centrifugal mixer ("ARE-310" from THINKY CORPORATION) in the mixing mode (2000 rpm) and then for 5 minutes in the defoaming mode (2200 rpm) to give an insulating varnish containing the partial discharge-resistant electrical insulating resin composition. In the resulting insulating varnish, the proportion of nonvolatile components to the entire dispersion was 15.9% by mass, and the proportion of the boehmite alumina to the entire nonvolatile components was 5.0% by mass.

(2-4. Preparation of Insulating Film)

The insulating varnish obtained in 2-3 above was applied to a 100-μm-thick rectangular PET film, using a blade coater set at a groove depth of 500 μm. The PET film being kept in a horizontal position was dried in a forced air oven sequentially for 15 minutes at 70° C., 45 minutes at 90° C., and 10 minutes at 130° C. to form an insulating film on the PET film. This insulating film was removed from the PET film, and then heat-treated sequentially for 10 minutes at 150° C., 10 minutes at 200° C., 10 minutes at 250° C., and 60 minutes at 300° C. to give an insulating film composed of the boehmite alumina and polyimide resin. The content of the boehmite alumina in the entire insulating film was 5.0% by mass, and the thickness of the film was 45 μm.

Example 3

(Preparation of Insulating Film)

An insulating film was obtained as in (2-4. Preparation of Insulating Film) in Example 2, except that the blade coater was set at a groove depth of 470 μm. The content of the boehmite alumina in the entire insulating film was 5.0% by mass, and the thickness of the film was 41 μm.

Example 4

(Preparation of Insulating Film)

An insulating film was obtained as in (2-4. Preparation of Insulating Film) in Example 2, except that the blade coater was set at a groove depth of 450 μm. The content of the boehmite alumina in the entire insulating film was 5.0% by mass, and the thickness of the film was 38 μm.

Example 5

(5-1. Preparation of Pre-Gel of Boehmite Alumina)

In a plastic sealed vessel, 1.0 g of an ethanol dispersion of plate-like boehmite alumina (10.0% by mass, average particle diameter: 20 nm, aspect ratio: 4) and 19.0 g of ethanol were placed, and the mixture was stirred for 3 minutes using a planetary centrifugal mixer ("ARE-310" from THINKY CORPORATION) in the mixing mode (2000 rpm) to give a pre-gel in which the proportion of the boehmite alumina to the entire pre-gel was 0.5% by mass.

5-2. Preparation of Electrodeposition Paint

In a 300-mL four-neck flask equipped with a stirrer and a thermometer, 200 g of a polyimide electrodeposition paint ("Q-ED-X0809" from PI R&D Co., Ltd; polyimide resin content: 8.8%) was placed, and then 17.8 g of the boehmite alumina pre-gel (0.5% by mass) prepared in 5-1 above was injected into the flask with a microsyringe over 10 minutes with stirring to give an electrodeposition paint containing the partial discharge-resistant electrical insulating resin composition. In the resulting electrodeposition paint, the proportion of the boehmite alumina to the entire nonvolatile components was 0.5% by mass.

(5-3. Preparation of Insulating Coating)

An insulating coating was prepared with the electrodeposition paint, using a stainless steel vessel as a cathode, and a nickel-plated copper sheet to be coated with an electrodeposition coating as an anode. The electrodeposition paint prepared in 5-2 above was placed in the stainless steel vessel, and electrodeposition was performed with stirring for a current-application time of 60 seconds at a voltage of 30 V. The copper sheet was then slowly withdrawn from the electrodeposition paint. The copper sheet was hung in a forced air oven and dried sequentially for 10 minutes at 100° C., 10 minutes at 200° C., and 10 minutes at 250° C. to give a copper sheet coated with an insulating coating. In the resulting insulating coating, the proportion of the boehmite alumina to nonvolatile components was 0.5% by mass, and the thickness of the coating was 35 μm.

Example 6

(Preparation of Insulating Coating)

An insulating varnish was prepared as in (2-3. Preparation of Insulating Varnish) in Example 2. Then, the insulating varnish was applied as in (2-4. Preparation of Insulating Film) in Example 2, except that the insulating varnish was applied to 280-μm-thick aluminum foil instead of the PET film, using a blade coater set at a groove depth of 550 μm. The insulating coating was then heat-treated as in 2-4 above, except that it was not removed from the aluminum foil, to form an insulating coating on the aluminum foil. In the resulting insulating coating, the proportion of the boehmite alumina to the entire nonvolatile components was 5.0% by mass, and the thickness of the coating was 50 μm.

Comparative Example 1

(Preparation of Polyimide Insulating Film)

The polyamide acid varnish prepared in Example 1 was applied to a 100-μm-thick rectangular PET film, using a blade coater set at a groove depth of 500 μm. The PET film being kept in a horizontal position was dried in a forced air oven sequentially for 15 minutes at 70° C., 45 minutes at 90° C., and 10 minutes at 130° C. to form a polyimide film on the PET film. This polyimide film was removed from the PET film, and then heat-treated sequentially for 10 minutes at 150° C., 10 minutes at 200° C., 10 minutes at 250° C., and 60 minutes at 300° C. to give an insulating film composed of the polyimide resin. The resulting insulating film had a thickness of 45 μm.

Comparative Example 2

(Preparation of Colloidal Silica Pre-Gel)

In a plastic sealed vessel, 2.1 g of colloidal silica ("SNOWTEX N" from Nissan Chemical Industries, Ltd.; concentration: 20.4%, average particle diameter: 13 nm) and 1.7 g of NMP were placed, and the mixture was stirred for 3 minutes using a planetary centrifugal mixer ("ARE-310" from THINKY CORPORATION) in the mixing mode (2000 rpm) to give a pre-gel in which the proportion of the silica to the entire pre-gel was 11.4% by mass.

(Preparation of Silica-Containing Varnish)

In a plastic sealed vessel, 3.8 g of the colloidal silica pre-gel (silica content: 11.4% by mass) prepared above and 50.0 g of a polyamide acid varnish (polyamide acid content: 8.2 g, NMP content: 41.8 g) prepared as in (1-2. Preparation of Polyamide Acid Varnish) in Example 1 were placed. The mixture was stirred for 5 minutes using a planetary centrifugal mixer ("ARE-310" from THINKY CORPORATION) in the mixing mode (2000 rpm) and then for 5 minutes in the defoaming mode (2200 rpm) to give a homogeneous silica-containing varnish. In the resulting varnish, the proportion of the silica to the entire nonvolatile components was 5.0% by mass, and the proportion of the nonvolatile components to the entire dispersion was 16.0% by mass.

(Preparation of Silica-Containing Insulating Film)

The resulting silica-containing varnish was applied to a 100-μm-thick rectangular PET film, using a blade coater set at a groove depth of 550 μm. The PET film being kept in a horizontal position was dried in a forced air oven sequentially for 15 minutes at 70° C., 45 minutes at 90° C., and 10 minutes at 130° C. to form a silica-containing film on the PET film. This film was removed from the PET film, and then heat-treated sequentially for 10 minutes at 150° C., 10 minutes at 200° C., 10 minutes at 250° C., and 60 minutes at 300° C. to give an insulating film composed of the silica and polyimide resin. In the resulting insulating film, the silica content in the entire film was 5.0% by mass, and the thickness of the film was 48 µm.

Comparative Example 3

An insulating film was prepared as in Comparative Example 1, except that the blade coater was set at a groove depth of 550 µm. The resulting film had a thickness of 50 µm.

Comparative Example 4

An insulating film was prepared as in Comparative Example 1, except that the blade coater was set at a groove depth of 500 µm. The resulting film had a thickness of 44 µm.

Comparative Example 5

An insulating film was prepared as in Comparative Example 1, except that the blade coater was set at a groove depth of 450 µm. The resulting film had a thickness of 34 µm.

Comparative Example 6

(Preparation of Colloidal Silica Pre-Gel)

In a plastic sealed vessel, 5 g of colloidal silica ("SNOWTEX O" from Nissan Chemical Industries, Ltd.; concentration: 20.5%, particle diameter: 10 to 15 nm) and 5 g of NMP were placed, and the mixture was stirred for 3 minutes using a planetary centrifugal mixer ("ARE-310" from THINKY CORPORATION) in the mixing mode (2000 rpm) to give a pre-gel in which the proportion of the silica to the entire pre-gel was 10.3% by mass.

(Preparation of Silica-Containing Varnish)

In a plastic sealed vessel, 5.52 g of the colloidal silica pre-gel (silica content: 10.3% by mass) prepared above and 60.0 g of a polyamide acid varnish (polyamide acid content: 10.8 g, NMP content: 49.2 g) prepared as in (2-2. Preparation of Polyamide Acid Varnish) in Example 2 were placed. The mixture was stirred for 5 minutes using a planetary centrifugal mixer ("ARE-310" from THINKY CORPORATION) in the mixing mode (2000 rpm) and then for 5 minutes in the defoaming mode (2200 rpm) to give a homogeneous silica-containing varnish. In the resulting varnish, the proportion of the silica to the entire nonvolatile components was 5.0% by mass, and the proportion of the nonvolatile components to the entire dispersion was 17.3% by mass.

(Preparation of Silica-Containing Insulating Film)

The resulting silica-containing varnish was applied to a 100-µm-thick rectangular PET film, using a blade coater set at a groove depth of 450 µm. The PET film being kept in a horizontal position was dried in a forced air oven sequentially for 15 minutes at 70° C., 45 minutes at 90° C., and 10 minutes at 130° C. to form a silica-containing film on the PET film. This film was removed from the PET film, and then heat-treated sequentially for 10 minutes at 150° C., 10 minutes at 200° C., 10 minutes at 250° C., and 60 minutes at 300° C. to give an insulating film composed of the silica and polyimide resin. In the resulting insulating film, the silica content in the entire film was 5.0% by mass, and the thickness of the film was 45 µm.

Comparative Example 7

An insulating film was prepared as in Comparative Example 6, except that the blade coater was set at a groove depth of 400 µm. The resulting film had a thickness of 40 µm.

Comparative Example 8

An insulating film was prepared as in Comparative Example 6, except that the blade coater was set at a groove depth of 370 µm. The resulting film had a thickness of 35 µm.

Comparative Example 9

(Preparation of Insulating Coating)

An insulating coating was prepared with an electrodeposition paint, using a stainless steel vessel as a cathode, and a nickel-plated copper sheet to be coated with an electrodeposition coating as an anode. In the stainless steel vessel, 200 g of a polyimide electrodeposition paint ("Q-ED-X0809" from PI R&D Co., Ltd; polyimide resin content: 8.8%) was placed, and electrodeposition was performed with stirring for a current-application time of 60 seconds at a voltage of 30 V. The copper sheet was then slowly withdrawn from the electrodeposition paint. The copper sheet was hung in a forced air oven and dried sequentially for 10 minutes at 100° C., 10 minutes at 200° C., and 10 minutes at 250° C. to give a copper sheet coated with an insulating coating. The resulting insulating coating had a thickness of 35 µm.

Comparative Example 10

An insulating film was prepared as in Comparative Example 1, except that the insulating varnish was applied to 280-µm-thick aluminum foil instead of the PET film, using a blade coater set at a groove depth of 550 µm. The insulating coating was heat-treated under the same conditions as described in Comparative Example 1, except that it was not removed from the aluminum foil, to form an insulating coating on the aluminum foil. The thickness of the resulting insulating coating was 50 µm.

Comparative Example 11

An insulating film was prepared as in Comparative Example 6, except that the insulating varnish was applied to 280-µm-thick aluminum foil instead of the PET film, using a blade coater set at a groove depth of 500 µm. The insulating coating was heat-treated under the same conditions as described in Example 6, except that it was not removed from the aluminum foil, to form an insulating coating on the aluminum foil. The thickness of the resulting insulating coating was 50 µm.

<Evaluation 1 of Partial Discharge Resistance>

(Partial Discharge Resistance Test for Insulating Films)

The insulating films prepared in Example 1, and Comparative Examples 1 and 2 were evaluated using the following testing method based on "Three-layered electrode-system sample" in "Electrical Discharge Handbook" (edited by the IEEJ Publication Committee on Electrical Discharge Handbook, 2003).

Figure 1:
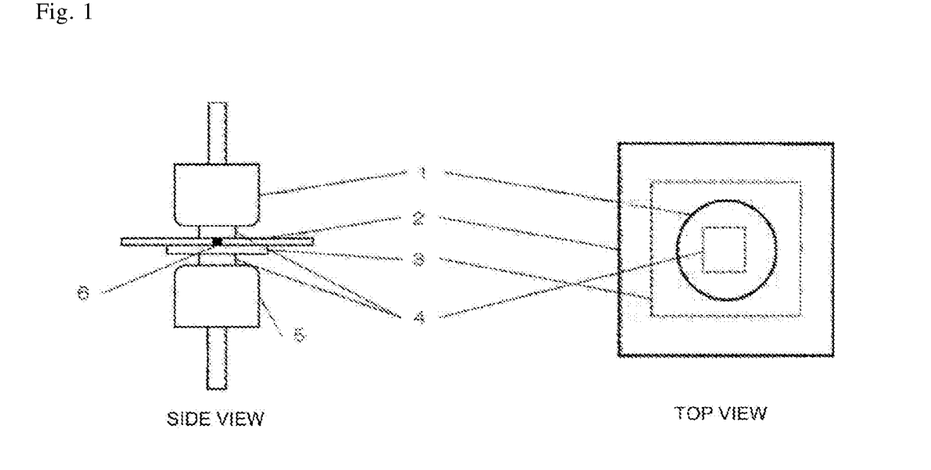
FIG. 1 is a schematic diagram showing a part of a testing method for evaluation of partial discharge resistance used in the Examples.

Specifically, the testing method was as follows: As shown in FIG. 1, an insulating film was inserted between an electrode 5, metal sheets 4, the insulating film 3 (thickness:

50±10 μm), a GAP-forming polyimide film 2 (60 μm) with a 5-mm-diameter void, and an electrode 1 sequentially from below, and partial discharge was induced in the void 6 of the GAP-forming polyimide film 2 to measure the time to a breakdown of the insulating film. A Volt-Endurance and Destruction Tester (Yasuda Seiki Seisakusho, Ltd.) was used as the measuring apparatus. Measurements were performed at a voltage of 4 kV, which was equal to or higher than the partial discharge starting voltage, and a frequency of 60 Hz. The results are shown in Table 1.

TABLE 1

|  | Breakdown Time |
|---|---|
| Example 1 | 1 h 18 min |
| Comparative Example 1 | 6 min |
| Comparative Example 2 | 38 min |

It is seen from Table 1 that the insulating film of the example exhibited a longer time to a breakdown and superior partial discharge resistance, compared to the insulating films of the comparative examples.

<Evaluation 2 of Partial Discharge Resistance>

(Partial Discharge Resistance Test for Insulating Films)

The insulating films with different thicknesses prepared in Examples 2 to 4 and Comparative Examples 3 and 4 were evaluated using the following testing method. Because the time to a breakdown varies depending on the thickness, the thickness was taken into consideration as a factor.

Figure 2:
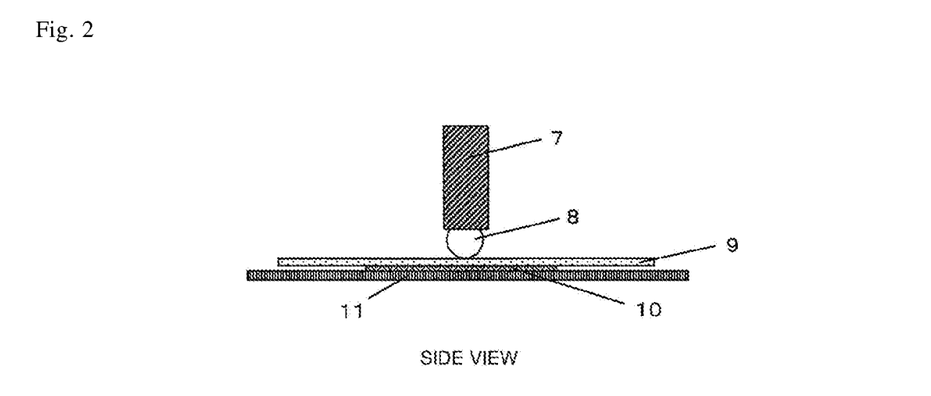
FIG. 2 is a schematic diagram showing a part of a testing method for evaluation of partial discharge resistance used in the Examples.

Specifically, the testing method was as follows: As shown in FIG. 2, sequentially from below, a small amount of conductive grease 10 was applied to an aluminum sheet 11 to attach an insulating film 9 thereto. Then, a metal ball (diameter: 1 mm) 8 and the insulating film 9 were pressed under the weight of a copper tube 7, with the copper tube 7 being immovably fixed. The copper tube 7 and the aluminum sheet 11 were connected to a power supply, such that the metal ball 8 served as a high-voltage electrode and the aluminum sheet 11 as a low-voltage electrode. With this structure, partial discharge was induced across the metal ball and the insulating film, and the time to a breakdown of the insulating film was measured. A Volt-Endurance and Destruction Tester (No. 175 from Yasuda Seiki Seisakusho, Ltd.) was used as the measuring apparatus.

Measurements were performed at a voltage of 3.5 kV, which was equal to or higher than the partial discharge starting voltage, and a frequency of 60 Hz. The results are shown in Table 2.

TABLE 2

|  | Filler Type Type (Shape) | Content (Mass %) | Thickness (μm) | Breakdown Time (h) |
|---|---|---|---|---|
| Example 2 | Boehmite Alumina (Plate-like) | 5 | 45 | 74 |
| Example 3 | Boehmite Alumina (Plate-like) | 5 | 41 | 59 |
| Example 4 | Boehmite Alumina (Plate-like) | 5 | 38 | 41 |
| Comparative Example 3 | Not Added | 0 | 50 | 5.5 |
| Comparative Example 4 | Not Added | 0 | 44 | 3.1 |
| Comparative Example 5 | Not Added | 0 | 34 | 0.8 |
| Comparative Example 6 | Colloidal Silica | 5 | 45 | 22 |
| Comparative Example 7 | Colloidal Silica | 5 | 40 | 13 |
| Comparative Example 8 | Colloidal Silica | 5 | 35 | 2.5 |

It is seen from Table 2 that each of the insulating films of the examples obtained by adding the boehmite alumina exhibited a longer time to a breakdown, compared to the insulating films of Comparative Examples 3 to 5 obtained without adding boehmite alumina. It is also seen that each of the insulating films of the examples had a longer lifetime, compared to the silica nanocomposite films of Comparative Examples 6 to 8 obtained by adding the colloidal silica.

<Evaluation 3 of Partial Discharge Resistance>

(Partial Discharge Resistance Test of Insulating Coatings Prepared with Electrodeposition Paints)

Figure 3:
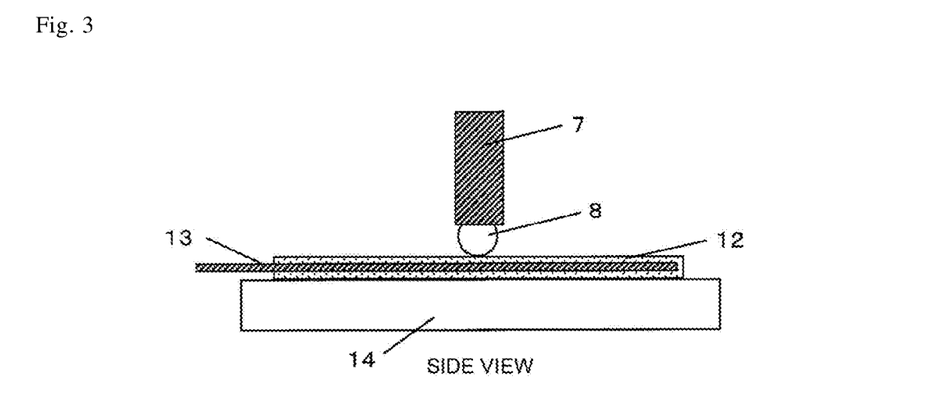
FIG. 3 is a schematic diagram showing a part of a testing method for evaluation of partial discharge resistance used in the Examples.

The insulating coatings prepared by electrodeposition in Example 5 and Comparative Example 9 were evaluated using the following testing method. Specifically, the testing method was as follows: As shown in FIG. 3, sequentially from below, a nickel-plated copper sheet 13 coated with an insulating coating 12 by electrodeposition was mounted on a stainless steel support 14. A metal ball (diameter: 2 mm) 8 and a copper tube 7 were sequentially placed thereon such that the nickel-plated copper sheet 13 was pressed under the weight of the copper tube 7, with the copper tube 7 being immovably fixed. The copper tube 7 and the nickel-plated copper sheet 13 were connected to a power supply, such that the metal ball 8 served as a high-voltage electrode and the nickel-plated copper sheet 13 as a low-voltage electrode. With this structure, partial discharge was induced across the metal ball and the insulating coating, and the time to a breakdown of the insulating coating was measured. The Volt-Endurance and Destruction Tester mentioned above was used as the measuring apparatus. Measurements were performed at a voltage of 2.5 kV, which was equal to or higher than the partial discharge starting voltage, and a frequency of 60 Hz. The results are shown in Table 3.

TABLE 3

|  | Filler Type (Shape) | Content (% by Mass) | Thickness (μm) | Breakdown Time (h) |
|---|---|---|---|---|
| Example 5 | Boehmite Alumina (Plate-like) | 0.5 | 35 | 2.9 |
| Comparative Example 9 | Not Added | 0 | 35 | 1.9 |

It is seen from Table 3 that the insulating coating of Example 5 obtained by dispersing the boehmite alumina exhibited a longer time to a breakdown and superior partial discharge resistance, compared to the insulating coating of Comparative Example 9 obtained without adding filler.

<Evaluation 4 of Partial Discharge Resistance (Evaluation of V-t Characteristic)>

(Partial Discharge Resistance Test for Insulating Coatings)

The insulating coatings prepared in Example 6, and Comparative Examples 10 and 11 were evaluated using the following testing method.

Figure 4:
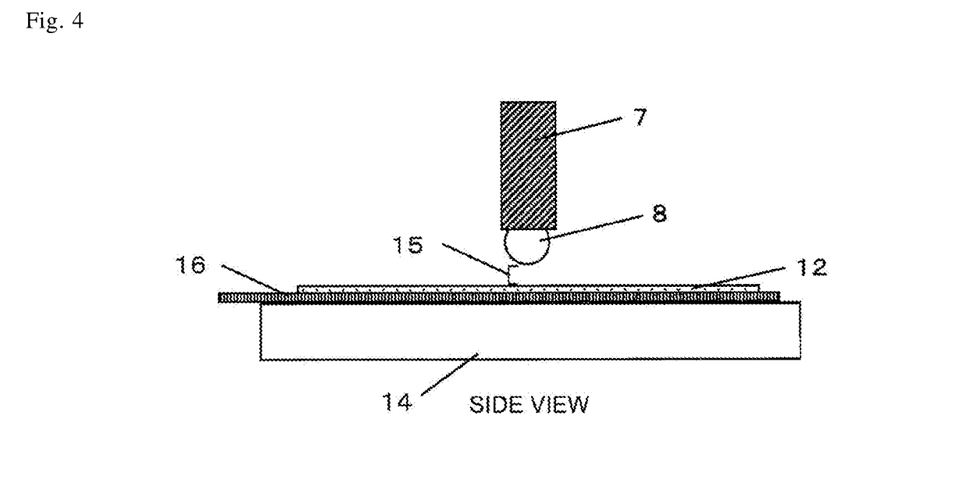
FIG. 4 is a schematic diagram showing a part of a testing method for evaluation of partial discharge resistance used in the Examples.

Specifically, the testing method was as follows: As shown in FIG. 4, sequentially from below, aluminum foil 16 coated with an insulating coating 12 by a casting method was mounted on a stainless steel support 14. A gap 15 was formed such that a lower end of a metal ball (diameter: 2 mm) 8 was positioned 200 µm above the insulating coating 12. A copper tube 7 and the aluminum foil 16 were connected to a power supply, such that the metal ball 8 served as a high-voltage electrode and the aluminum foil 16 as a low-voltage electrode. With this structure, partial discharge was induced across the lower end of the metal ball and the insulating coating, and the time to a breakdown of the insulating coating 12 was measured. The Volt-Endurance and Destruction Tester mentioned above was used as the measuring apparatus.

Figure 5:
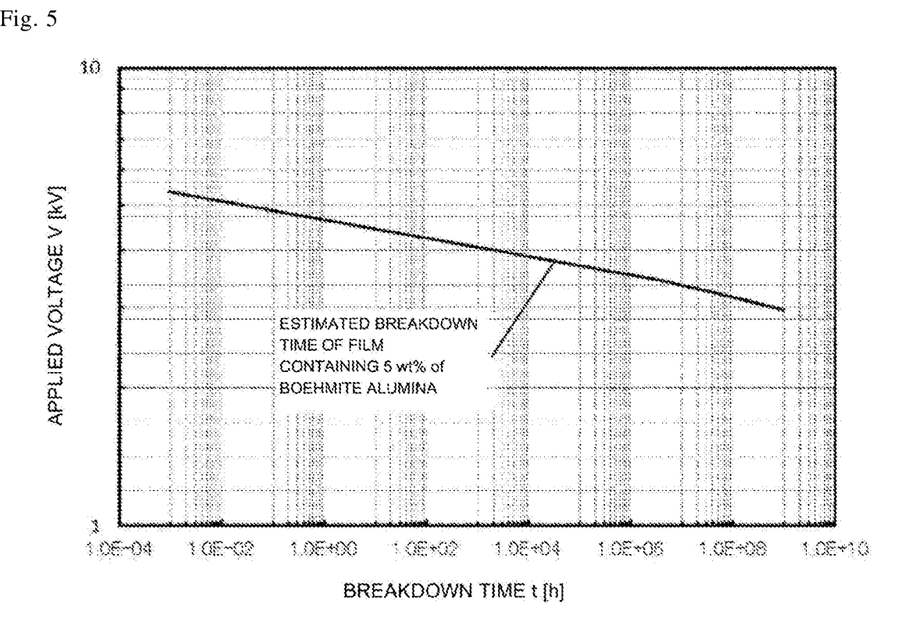
FIG. 5 is a graph showing the applied voltage versus the time to a breakdown of the insulating coating of Example 6.

In the case of the insulating coating of Example 6 obtained by adding the boehmite alumina, the time to a breakdown was not observed at an applied voltage of 3 kV. Thus, the test was performed at a voltage of 4.06 to 5.22 kV, and an estimated time to a breakdown in the case where the test was performed at an applied voltage of 3 kV was calculated. The results are shown in FIG. 5. For each of the insulating coating of Comparative Example 10 obtained without adding filler and the silica nanocomposite of Comparative Example 11, a single-point test was performed at 3 kV. Measurements were performed at a frequency of 60 Hz. The results are shown in Table 4.

TABLE 4

| | Filler Type (Shape) | Content (Mass %) | Applied Voltage (kV) | Thickness (µm) | Breakdown Time (h) |
|---|---|---|---|---|---|
| Example 6 | Boehmite Alumina (Plate-like) | 5 | 4.35 | 50 | 83 |
| | | | 4.06 | 50 | 136 |
| | | | 3 | 50 | $6.6 \times 10^8$ Estimated Value |
| Comparative Example 10 | Not Added | 0 | 3 | 50 | 16 |
| Comparative Example 11 | Colloidal Silica | 5 | 3 | 50 | 29 |

It is seen from Table 4 that the insulating coating of Example 6 obtained by adding the boehmite alumina exhibited a longer time to a breakdown at a high applied voltage, and hence, superior partial discharge resistance, compared to the insulating coatings of Comparative Examples 10 and 11. It is also seen from the graph plotting the V-t characteristic as shown in FIG. 4 that the insulating coating obtained by adding the boehmite alumina clearly had a longer lifetime, compared to the insulating coating obtained without adding filler or the insulating coating obtained by adding the silica.

REFERENCE SIGNS LIST 1 electrode
2 GAP-forming film
3 insulating film
4 metal sheet
5 electrode
6 void
7 copper tube
8 metal ball (diameter: 2 mm)
9 insulating film
10 conductive grease
11 aluminum sheet
12 insulating coating
13 nickel-plated copper sheet
14 stainless steel support
15 gap
16 aluminum foil

The invention claimed is:

1. A partial discharge-resistant electrical insulating resin composition comprising boehmite alumina and a resin, wherein the boehmite alumina is nanoparticles having an average particle diameter of 20-500 nm in an amount of 0.1 to 30 wt %, wherein the resin is a polyimide resin, wherein the boehmite alumina has a shape of plate-like particles and an aspect ratio (length/width) of 2 to 35, and wherein the boehmite alumina is dispersed in the resin by using boehmite alumina dispersed in an organic solvent or water during mixing of the boehmite alumina with the resin.

2. The partial discharge-resistant electrical insulating resin composition according to claim 1, which is resistant to an inverter surge.

3. The partial discharge-resistant electrical insulating resin composition according to claim 1, which is for use with an electrical apparatus in which inverter control is performed.

4. An insulating varnish comprising the partial discharge-resistant electrical insulating resin composition according to claim 1 and a solvent.

5. An electrodeposition paint comprising the partial discharge-resistant electrical insulating resin composition according to claim 1 and a solvent.

6. A cured product formed from the partial discharge-resistant electrical insulating resin composition according to claim 1.

7. A method for producing the partial discharge-resistant electrical insulating resin composition according to claim 1, comprising the steps of:
   pre-gelling the boehmite alumina; and
   mixing the pre-gelled boehmite alumina with the resin.

8. An electric wire comprising:
   a conductor; and
   an insulating coating comprising a single layer or a plurality of layers formed on an outer periphery of the conductor, wherein the insulating coating comprises at least one layer of a cured product of the partial discharge-resistant electrical insulating resin composition according to claim 1.

9. A rotating electric machine comprising the electric wire according to claim 8.

10. An insulating film comprising an insulating layer comprising the partial discharge-resistant electrical insulating resin composition according to claim 1 or a cured product thereof.

11. An insulating coating comprising an insulating layer comprising the partial discharge-resistant electrical insulating resin composition according to claim 1 or a cured product thereof.

12. The partial discharge-resistant electrical insulating resin composition according to claim 1, wherein the amount of boehmite alumina is 2 to 5% by mass.

13. The partial discharge-resistant electrical insulating resin composition of claim 1, wherein the average particle diameter of the boehmite alumina is about 20 nm and wherein the mass % of boehmite alumina in the composition is from 0.5% to 5%.

* * * * *